(12) United States Patent
Schulden et al.

(10) Patent No.: US 6,356,877 B1
(45) Date of Patent: Mar. 12, 2002

(54) APPARATUS AND PROCESS FOR AUTOMATED PAYMENT FOR THE ATTACHMENT OF ADVERTISING TO A VEHICLE

(76) Inventors: Christoph J. Schulden, Bussardstrasse 59, Bubenreuth (DE), D-91088; S. Quintus F. F. Von Bonin, 131 Mercer St., 3A, New York, NY (US) 10012

( * ) Notice: Subject to any disclaimer, the term of this patent is extended or adjusted under 35 U.S.C. 154(b) by 0 days.

(21) Appl. No.: 09/433,406

(22) Filed: Nov. 3, 1999

Related U.S. Application Data

(63) Continuation of application No. PCT/EP99/06177, filed on Aug. 23, 1999.

(51) Int. Cl.$^7$ .............................................. G06F 17/60
(52) U.S. Cl. ................................................. 705/14
(58) Field of Search ....................... 705/14, 13

(56) References Cited

U.S. PATENT DOCUMENTS

| | | | |
|---|---|---|---|
| 4,671,004 A | 6/1987 | Berg | 40/592 |
| 5,072,380 A | 12/1991 | Randelman et al. | 364/406 |
| 5,204,819 A | * 4/1993 | Ryan | 705/413 |
| 5,420,606 A | 5/1995 | Begum et al. | 345/156 |
| 5,422,624 A | 6/1995 | Smith | 340/438 |
| 5,906,228 A | 5/1999 | Keller | 141/94 |

FOREIGN PATENT DOCUMENTS

| | | |
|---|---|---|
| DE | 93208928 | 6/1995 |
| DE | 19501638 | 7/1996 |
| EP | 0131211 | 1/1985 |
| WO | WO94/28526 | 12/1994 |
| WO | WO00/11642 | 3/2000 |

OTHER PUBLICATIONS

"Chemical–Shell card in credit patent dispute", American Banker, Feb. 17, 1994, p. 17.*

* cited by examiner

Primary Examiner—Eric W. Stamber
Assistant Examiner—Donald L. Champagne
(74) Attorney, Agent, or Firm—Baker Botts L.L.P.

(57) ABSTRACT

The apparatus includes a first communication device 20 disposed at a control point 14 and a second communication device 26 disposed on the advertising medium 16. The second communication device supplies data for the first communication device, by means of which the presence and integrity of the advertising medium on the vehicle can be checked. Other information bearing on the eligibility of the vehicle for a credit may be included in the data and checked by the first communication device. The apparatus and method also include a device for issuing a credit as payment for the attachment of the advertising medium to the vehicle, provided that the result of the check for the presence and integrity of the advertising is positive.

32 Claims, 2 Drawing Sheets

APPARATUS AND PROCESS FOR AUTOMATED PAYMENT FOR THE ATTACHMENT OF ADVERTISING TO A VEHICLE

REFERENCE TO PRIOR APPLICATION

The present application is a continuation of International (PCT) application number PCT/EP 99/06177, filed Aug. 23, 1999.

BACKGROUND OF THE INVENTION

The present invention relates to a device for automated payment of the fee for the attachment of an advertising medium to a vehicle.

The commercial attachment of advertising media to vehicles has been known for a long time. Advertising sheets are frequently attached, for example, to large surfaces of public transportation vehicles such as buses, street cars, commuter trains, subways, or taxis. The businesses which are advertised on these sheets pay a certain fee for this to the operators of the public transportation vehicles or taxi companies. This fee can be paid, for example, at certain time intervals.

In order to assure that the advertising medium is properly attached to the vehicle, an employee of the advertising company or a business authorized to do so performs visual inspections of the vehicle from time to time. This monitoring process incurs considerable costs due to the high cost of personnel. In order to maintain a justifiable relationship between the costs, which are incurred by the attachment of the advertising medium and the visual inspections, and the economic effect achieved by the advertisement, the visual inspections have up to now only been performed at relatively long time intervals.

With regard to the general technological field, the following references are of interest:

WO-A-94/28526 has disclosed supplying data to vehicles, for example at filling stations, which are then communicated to the passengers of the vehicle when they resume their travel.

DE-A-44 33 569 has disclosed that customers in a supermarket or the like are first shown which products are being offered at a discount on a display/input device and then, through the corresponding actuation of a keypad of the display/input device, the products that they are interested in can be selected. However, the discount is only given if it is later determined at the cash register that the relevant product has also actually been purchased.

Finally, DE-U-93 20 892 has disclosed a utilization control system for ski lifts and aerial cableways which carries out a contact-free inspection as to whether a person has the right to enter the ski lift or aerial cableway.

SUMMARY OF THE INVENTION

An object of the present invention is to provide a device that automatically inspects the attachment of an advertising medium to a vehicle and automatically pays the vehicle owner or vehicle driver, such as by applying a credit towards a purchase or in some other manner, if the advertising medium is properly placed on the vehicle.

The foregoing object is attained according to the invention by means of a device for automated payment of the fee for the attachment of at least one advertising medium to a vehicle, which includes a first communication device disposed at a control point and a second communication device disposed on the advertising medium, wherein the second communication device supplies data for the first communication device by means of which the presence of the advertising medium on the vehicle can be verified, as well as a device for issuing a credit as payment for the attachment of the advertising medium to the vehicle depending on the result of the presence check. The automatic inspection of the proper placement of the advertising medium on the vehicle takes place through the communication of the two communication devices. If the results of the inspection are positive, then a credit is automatically issued as payment for the attachment of the advertising medium to the vehicle.

One of the advantages of the automatically executed inspection according to the invention as to the proper placement of the advertising medium on the vehicle as well as the automatic payment to the vehicle owner can naturally be viewed in terms of the reduction in cost which goes along with the complete elimination of human labor. This permits the time intervals between two subsequent inspections to be shortened so that a large quantity of vehicles, among others private vehicles as well, can now be considered for the attachment of advertising media and a national advertising program can be efficiently mounted. An increased efficiency of the inspection and billing process, the prevention of human error, and the prevention of intentionally false actions in inspection and billing can be mentioned as additional advantages. Finally, it should also be emphasized that there is the possibility of a simple incorporation of the invention into existing IT systems.

In order to be able to assure the shortest possible inspection intervals even if the length of the time interval between two succeeding inspections is not stipulated, places that are frequently visited by vehicles anyway can be considered as control points. This is the case with filling stations and/or toll booths, for example.

If the credit is calculated directly into the amount to be paid at the filling station and/or toll booth, then the driver of the vehicle can be offered a further incentive to visit the control point frequently. Basically, however, it is likewise possible to issue the credit in the form of a credit receipt which can then be redeemed at a subsequent stop at the control point or at other locations, for example stores and the like. Finally, another possibility is to issue the credit by means of a corresponding entry on a read/write storage medium such as a chip card or magnetic strip card. In this case, the credit can be redeemed at any location that accepts this card as a method of payment. However, the read/write storage medium can also be fixed to the vehicle or the advertising medium and can, for example, simply permit the crediting of amounts to be paid at this control point or other comparable ones. It should be emphasized at this point that the first communication device and the device for issuing the credit can be embodied as one functional unit.

The first communication device and the second communication device can be designed for a unidirectional communication as well as for a bidirectional communication. In the case of unidirectional communication, the second communication device simply supplies data which can then be detected by the first communication device. To this end, the second communication device can include for example at least one bar code disposed on the advertising medium, while the first communication device has a bar code reading device for detecting the at least one bar code. The bar code can contain all data necessary for issuing the credit. If a number of bar codes are distributed over the surface of the advertising medium, then in addition to checking for the mere presence of the advertising medium on the vehicle, the first communication device can also check the integrity of the advertising medium. In this instance, for example, the advertising medium can be viewed as intact if the first communication device detects and confirms the presence of all of the originally provided bar codes.

In order to increase the reliability of the process it can be advantageous if the vehicle owner or vehicle driver does not know and cannot tell where the data supplied by the second communication device is disposed on the surface of the advertising medium. In this case, provision can be made that the first communication device includes a camera and an image processing unit and/or pattern recognition unit for detecting at least one surface feature of the advertising medium and this surface feature constitutes the second communication device.

By disposing several of such surface features in various locations spaced apart from one another on the surface of the advertising medium, it becomes possible in turn to check the integrity of the advertising medium.

As mentioned above, the communication between the two communication devices can also be bidirectional communication. To this end, the first communication device can "ask" the second communication device for the necessary data, whereupon the second communication device actively transmits this data to the first communication device. For example, the first communication device can include an interrogator which initiates a data exchange connection with a transponder of the second communication device. The transponder of the second communication device can, for example, be a passive transponder, i.e. a transponder without its own energy supply. Passive transponders of this kind are intrinsically known in the prior art and therefore need not be explained in detail here.

As explained above, it is advantageous to check the integrity of the advertising medium. To this end, the provision can be made that the second communication device includes at least one sensor unit for detecting the integrity of the advertising medium. This can for example include a conductor loop and a resistance sensor, wherein the conductor loop advantageously extends at least in surface regions that are highly significant for achieving the desired advertising effect. With the aid of the resistance sensor, a detection can be performed as to whether the conductor loop has been broken or not. If the conductor loop is not broken, it can be determined from this that the advertising medium is intact.

For the case of bidirectional communication between the two communication devices, the particular proposal is made that the second communication device is designed to receive and store data which are sent to it by the first communication device. For example, if a detection has established that the advertising medium is present and if need be, has established that it is intact, and there is also no other obstacle to issuing a credit, the two communication devices can exchange a time signal and at least one of the two communication devices can store the time corresponding to the current instant.

The next time the vehicle stops at or passes by a control point, a determination can be made based on this time data as to whether or not a predetermined time interval has passed since the preceding issuance of a credit. If too little time has passed since the last credit was issued, then this could be a reason to deny the issuance of a new credit even if the advertising medium is present and intact. In a simple manner, this measure can prevent the owner of a vehicle equipped with an advertising medium from fraudulently emptying the tank after filling up the vehicle at a discount due to a credit, and subsequently returning to the filling station in order to refuel the vehicle and claim another discount.

The length of this preset time interval can be agreed upon between the vehicle owner and the advertising company as a function of vehicle usage, for example as a function of the distance that the vehicle has to travel in a predetermined period of time. By means of this, the advertising company can accord a preferential treatment to vehicle owners whose vehicle is driven extensively and consequently produces a high degree of advertising visibility. The maintenance of the agreed-upon amount of driving can be monitored, for example, through occasional visual inspections of the vehicle.

As another feature of the invention it is also possible that one of the communication devices supplies data regarding the time at which the advertising medium is attached to the vehicle. Namely, if the advertising company or an agency appointed by it always sets the contracts with the vehicle owners for a predetermined time period, then this data is enough to determine whether the life of the contract has already expired and to possibly avoid issuing a credit after the life of the contract expires.

However, if flexible contract periods should be desired, then the provision can furthermore be made that the second communication device supplies data regarding the duration of the agreed-upon attachment of the advertising medium to the vehicle.

Particularly, if there is also an active vehicle identification device in the vehicle, which supplies data identifying the vehicle to the first communication device, it is advantageous if the second communication device also supplies data about the vehicle to which the advertising medium should be attached. Through a comparison of the data of the vehicle identification device on the one hand and of the second communication device on the other, a check can also be made as to whether the advertising medium is actually attached to the vehicle contractually agreed upon. This increases the security of the device according to the invention against fraudulent misuse.

In an advantageous embodiment of the invention, an approach detection device can also be provided which activates the first communication device and/or the second communication device upon detection of an approach of the vehicle to the control point. The approach detection device can include an induction loop, for example placed in a driving surface of the control point.

The advertising medium can, in an intrinsically known manner, include a sheet printed with the advertisement, i.e. an essentially two-dimensional body. However, it is likewise possible that the advertising medium includes a three-dimensional body, for example a stylized bottle or the like, which can be disposed on the roof of the vehicle. Finally, it is also conceivable that the advertisement—particularly with a longer contract life—can also be attached by means of being painted on. In this instance, the advertising medium is the paint of the vehicle.

In both cases, however, it is advantageous if the advertising medium is embodied and/or can be disposed on the vehicle in such a way that on the one hand, it can be removed without damaging the vehicle but on the other hand, it can only be removed from the vehicle by destroying the advertising medium itself. For the case of advertising sheets, this can be achieved, for example, through the use of an adhesive on the back side of the sheets which can easily be removed from the vehicle finish and through the provision of incisions at definite points of the outer edge of the sheet or the sheet surface, as is known for example from highway decals in Switzerland or Austria or TÜV [Technischer Überwachungsverein, Technical Control Association] plaques in Germany. When the sheet is removed from the vehicle, the sheet tears at the locations provided for this, which renders the sheet unusable. The tendency to easily tear in the event of a non-contractual attempt to remove the sheet can be further enhanced through the suitable choice of the material for the sheet. In the event that the above-disclosed conductor loop used for integrity inspection is provided, it should extend at least in the region of the above-described intentional tearing points in the vicinity of the sheet edge.

According to another aspect, the invention relates to a process for payment of the fee for the attachment of at least one advertising medium to a vehicle. With regard to the possible process variants and the advantages that can be achieved by them, reference is made to the above discussion of the device according to the invention.

Finally, the invention also relates to an advertising medium that is equipped with a transponder and is configured to be attached to a vehicle. Reference is also made to the above discussion in regard to the advantages that can be achieved with this advertising medium.

The invention will be explained in detail below in an exemplary embodiment in conjunction with the accompanying drawings.

DESCRIPTION OF THE EMBODIMENTS

Figure 1:
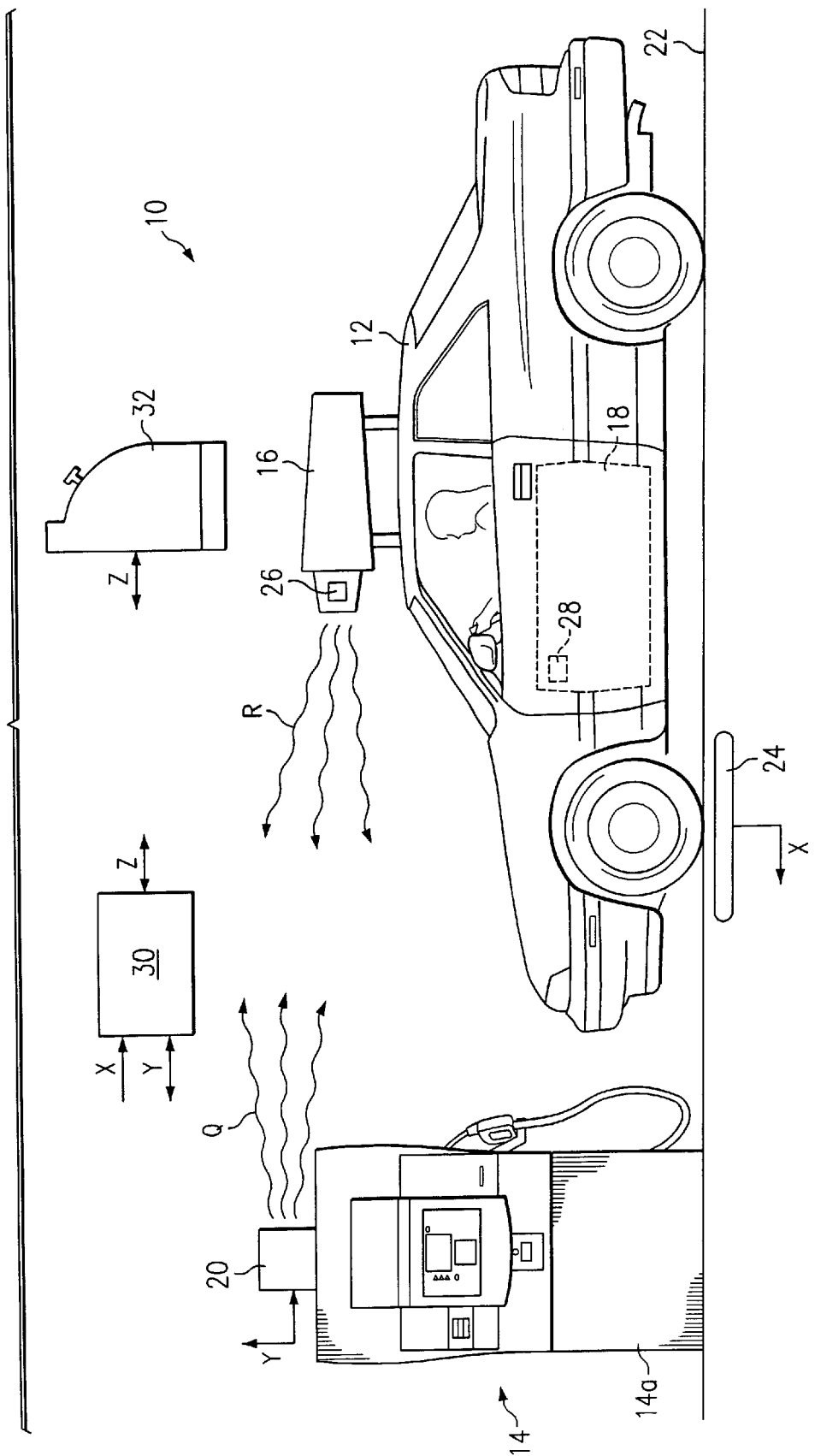
FIG. 1 shows a vehicle with an advertising medium stopping at a filling station.

In FIG. 1, apparatus according to the invention for automated payment of the fee for the attachment of an advertising medium to a vehicle is indicated in a very general manner by the reference numeral 10.

A vehicle 12 is disposed in the vicinity of a control point 14. In the exemplary embodiment shown, a filling station schematically indicated in FIG. 1 by means of a gas pump 14a is used as a control point 14. The sculpture of a tube is disposed on the roof of the vehicle 12 as an advertising medium 16. In addition or alternatively to this, however, an advertising sheet 18 can also be disposed on or near the side surfaces of the vehicle.

A first communication device 20, which in the current exemplary embodiment is constituted by an interrogator, is disposed in the vicinity of the gas pump 14a of the filling station 14. When the vehicle 12 comes into the vicinity of an induction loop 24 disposed in the roadway or driveway surface 22, the interrogator 20 initiates a data exchange connection with a transponder 26 of the advertising sculpture 16 or a transponder 28 of the advertising sheet 18. According to the current invention, the transponders 26 and 28, each by themselves or together, constitute the second communication device.

More precisely stated, as the vehicle 12 approaches, the induction loop 24 transmits an approach signal to a central control unit 30 by way of a data line X.

Then, the control unit 30 activates the interrogator 20 by way of a data line Y and the interrogator emits a query signal Q to the transponder 26 and/or the transponder 28 as a result of this activation. (For the sake of simplicity, only the transponder 26 will be referred to below.)

The response signal R, which is sent back to the interrogator by the transponder 26 in reaction to the query signal Q, can contain a whole series of data which are then transmitted by the interrogator 20 to the central control unit 30 via the data line Y. For example, these data can include:
  information that the advertising medium 16 is present on the vehicle 12;
  information that the advertising medium 16 is intact;
  information regarding how long the advertising medium 16 has been attached to the vehicle 12;
  information as to the duration of the contract between the owner of the vehicle 12 and the advertising company;
  information regarding the vehicle to which the advertising medium 16 should be attached;
  information regarding how much time has passed since the last time a credit was issued;
  information as to whether unclaimed credits exist and if so the amount; and
  other information of a kind similar to the foregoing.

Based on the data sent to it, the central control unit 30 determines whether or not the owner of the vehicle 12 is entitled to a credit with this filling station visit. For example, if a predetermined time period, e.g. one week, has passed since the last filling station visit and the contract between the vehicle owner and the advertising company has not yet expired, and furthermore if the advertising medium 16 is attached to the vehicle 12 in an intact state, then the control unit 30 determines that the owner of the vehicle 12 is entitled to a credit and transmits a corresponding signal to an automated payment point 32 by way of a signal line Z.

If the vehicle driver claims the credit when paying the fuel bill, then the amount credited to him can be immediately calculated into the amount being charged for the fuel. However, if the vehicle driver does not claim the credit or does not do so fully, then the automated cash point 32 informs the central control unit 30 of this fact, and the control unit sends a corresponding signal to the interrogator 20. The interrogator 20 transmits a credit signal to the transponder 26 regarding the amount of the unclaimed portion of the credit which the transponder 26 "notes" in a memory 50 (see FIG. 2c). This credit stored in the memory can be claimed at any time in a subsequent filling station visit.

Figure 2A:
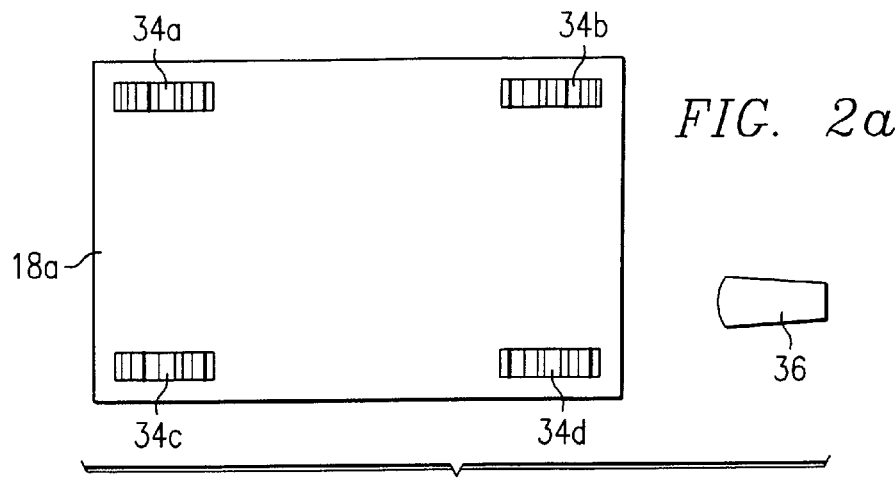
FIGS. 2a–2c are schematic representations of different embodiments of advertising sheets suitable for use with the apparatus and process of the present invention.
Figure 2B:
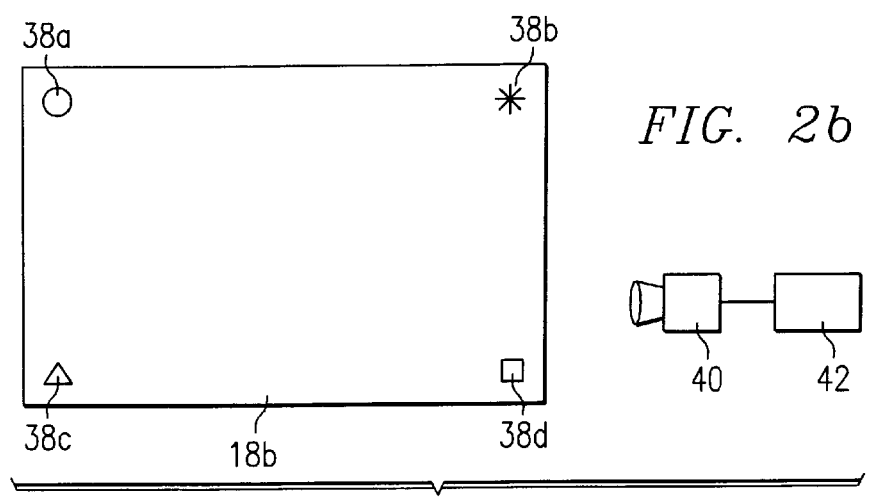
Figure 2C:
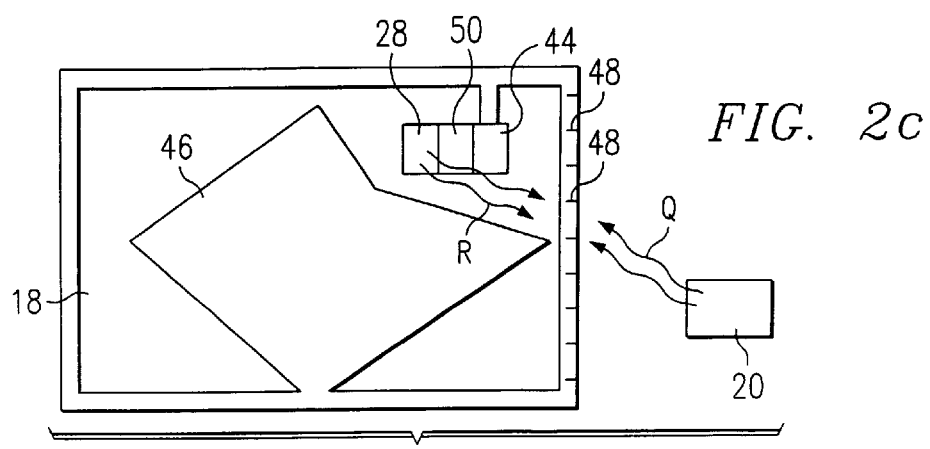

Three examples for embodiments of advertising sheets 18 are schematically depicted in FIGS. 2a to 2c.

According to FIG. 2a, four bar code fields 34a, 34b, 34c, and 34d are located at various places on the advertising sheet 18a, and their existence can be detected by means of a reading device 36 associated with the first communication device 20. Only when all four bar code fields 34a to 34d are present is the advertising sheet 18a recognized as intact, which is a basic prerequisite for the issuance of a credit.

According to FIG. 2b, four surface features 38a, 38b, 38c, and 38d are located at various places on the surface of the advertising sheet 18b, which in the current instance, are represented in a stylized form as a circle, a star, a triangle, and a square. The shapes of these surface features can be selected with a completely free hand. It is only necessary that the data content be suitable for definite encoding. A camera 40 takes a picture of the advertising sheet 18b from which an image processing and/or pattern recognition unit 42 extracts the surface features 38a to 38d. Only when all four surface features 38a to 38d are present is the advertising sheet 18b recognized as intact.

According to FIG. 2c, the advertising sheet 18 contains a passive transponder 28, i.e., a transponder which does not have its own energy supply, but receives the energy necessary for its operation from the query signal Q of the interrogator 20. The transponder 28 is associated with a resistance sensor 44, which is connected to a conductor loop 46. In the exemplary embodiment shown, first the conductor loop 46 extends essentially completely along the outer edge of the advertising sheet 18 and then also extends over the entire surface of the advertising sheet 18. Only if the resistance of the conductor loop 46 has a value that is lower than a predetermined value is the advertising sheet 18 recognized as intact. However, if the advertising sheet 18 is torn in its edge region and as a result, the conductor loop 46 is cut, then the advertising sheet will be viewed as damaged. It is possible to dispose a number of conductor loops at various distances from the edge of the sheet 18 in order to thus be able to detect various degrees of damage.

In order to assure that the advertising sheet 18 is irreparably damaged when it is removed from the paint of the vehicle 12, incisions 48 can be provided on the edge of the sheet 18, as indicated by way of example on the right edge of the sheet 18 in FIG. 2c. These incisions 48 serve as intentional tear points which prevent the sheet from being removed from the vehicle 12 without being destroyed. Although this is not shown in FIG. 2c, intentional tear points of this kind can also be provided in the face region of the sheet 18.

Although the invention has been explained above in relation to the example of a filling station as the control point 14, it should be emphasized that the invention can also be used at other types of control points, for example at toll booths or parking lots or garages. In this instance, the first communication device 20 can be disposed in the vicinity of a toll bar or tollgate of the toll booth. Toll booths of this kind are known, for example, in the USA, France, and Italy. Control points can also include relay stations of mobile telephone networks remote from the road, induction loop devices in the pavement, satellites orbiting the earth, and the like.

It should also be emphasized that when "refueling" or "fuel" are referred to above, the supply of any kind of energy carrier to the vehicle 12 is intended. In this spirit, refueling is therefore understood to also be, for example, the recharging of batteries of an electric vehicle. Correspondingly, in addition to Otto fuel and diesel fuel, alcohols, oils, gas, hydrogen, and the like are being increasingly considered as fuels.

The invention relates, in addition to the foregoing, to a process for checking for the presence of advertising of a company on vehicles at set time intervals. It is generally known to attach advertising to motor vehicles in different ways. A company can also supply such advertising for motor vehicles. The owner of the vehicle then generally receives a payment for displaying the advertising on the vehicle. This payment can be arranged on a time basis so that the owner of the vehicle can attach another advertisement to his vehicle after the agreed-upon advertising period has expired.

In order to then assure that the advertisement is also actually attached during the agreed-upon display period, the company running the advertisement or one authorized to do so generally performs inspections in order to check from time to time whether the advertisement of this company has been properly placed on the motor vehicle. This monitoring process therefore requires monitoring work which incurs considerable costs.

WO-Al-94/28526 has disclosed a process for inputting data, in particular advertising data, into vehicles when they are in the vicinity of a filling station for the purpose of refueling. The data can be input as a function of the data received from the vehicle, in particular characteristics of the driver, the vehicle, and the destination of the vehicle. In this instance, the data input can be executed by means of a transmitting device attached to a gas pump nozzle and a receiving device connected to the vehicle by way of the tank filler pipe.

The object of the process of the present invention is to check for the presence of advertising of a company on vehicles at set time intervals with minimal expense. This object is attained by means of company-issued credits that can be redeemed by the drivers of the vehicles, such as by redemption of the credits against purchases at filling stations or receiving cash or some other payment document, after the presence of the advertisement is checked.

According to another embodiment of the process, the redemption of a credit is preferably made to depend on whether a particular time., e.g. a week or a month, has passed since the last time a credit was issued. For example, this prevents the tank of the vehicle from being prematurely emptied and refueled before a subsequent control interval has begun. It is possible to check and pay for the attachment of advertising at regular intervals. As explained above, the length of the predetermined time can be selected in accordance with an amount of driving agreed upon between the vehicle owner and the advertising company.

According to another embodiment of the invention, the inspection as to the proper placement of the advertising attachment is carried out by means of a reading device, for example by means of a scanner. If this inspection determines that the advertisement indicated on the fuel credit is actually attached to the vehicle, this credit is calculated into the price of the fuel dispensed. If this is not the case, the fuel dispensed must be paid for without the credit being calculated into the price.

According to another embodiment of the invention, the fuel credit has the form of a debitable chip card or storage medium. After the refueling, this chip card or storage medium is taken by the gas station attendant who plugs it into his reading and debiting device in order to perform the debit. The medium can store data regarding the vehicle and its owner. The debiting amount is thereby withdrawn from the account of the company that is being advertised.

According to another embodiment of the invention, a debitable medium that contains the fuel credit is provided on the vehicle while the gas pump nozzle with a device for debiting the dispensed fuel on the medium and from the account of the company is provided in the filling station. To that end, this device of the gas pump nozzle need only be brought into the vicinity of the medium.

According to another embodiment of the invention, the integrity of the advertisement can be determined. The medium only permits the debiting if a device receives a message confirming the integrity of the advertising surfaces. As a result, the presence of the advertising surfaces can be automatically inspected. This device can operate, for example, with a number of sensors or bar codes, which are distributed over the advertising surfaces, and can detect particular properties of the advertising surfaces.

What is claimed is:

1. Apparatus for automated payment of the fee for the attachment of at least one advertising medium to a vehicle, comprising:

means including a first communication device disposed at a control point and a second communication device disposed on the advertising medium for checking the presence of the advertising medium on the vehicle and producing a signal indicative thereof, and means for issuing a credit as payment for the attachment of the advertising medium to the vehicle in response to the signal.

2. The apparatus according to claim 1, wherein the control point includes at least one of a filling station, a toll booth, an induction device in a roadway, a relay station of a mobile telephone network, and a satellite orbiting the earth.

3. The apparatus according to claim 1, wherein the second communication device includes at least one bar code disposed on the advertising medium and the first communication device includes a bar code reading device for detecting the at least one bar code.

4. The apparatus according to claim 3, wherein the second communication device includes a number of bar codes which are distributed over the surface of the advertising medium.

5. The apparatus according to claim 1, wherein the first communication device includes a camera and an image processing unit and/or pattern recognition unit for detecting at least one surface feature of the advertising medium, which surface feature is at least in part the second communication device.

6. The apparatus according to claim 5, wherein the second communication device includes a plurality of surface features which are distributed over the surface of the advertising medium.

7. The apparatus according to claim 1, wherein the first communication device includes an interrogator, which initiates a data exchange connection with a transponder of the second communication device.

8. The apparatus according to claim 7, wherein the transponder is a passive transponder.

9. The apparatus according to claim 1, wherein the second communication device includes at least one sensor unit for detecting the integrity of the advertising medium.

10. The apparatus according to claim 9, wherein the sensor unit includes a conductor loop and a resistance sensor.

11. The apparatus according to claim 1, wherein the second communication device is arranged to receive and store data which are sent to it by the first communication device.

12. The apparatus according to claim 1, wherein the second communication device supplies data regarding the time at which a preceding credit was issued.

13. The apparatus according to claim 1, wherein the second communication device supplies data regarding the time at which the advertising medium was attached to the vehicle.

14. The apparatus according to claim 1, wherein the second communication device supplies data regarding the duration of an agreed-upon time period for which the advertising medium is to remain on the vehicle.

15. The apparatus according to claim 1, the second communication device supplies data regarding the vehicle to which the advertising medium is attached.

16. The apparatus according to claim 1, and further comprising an approach detection device which activates the first communication device and/or the second communication device upon detection of an approach of the vehicle to the control point.

17. The apparatus according to claim 16, wherein the approach detection device includes an induction loop.

18. The apparatus according to claim 1, wherein the advertising medium comprises a sheet.

19. The apparatus according to claim 1, wherein the advertising medium comprises a three-dimensional body.

20. The apparatus according to claim 1, wherein the advertising medium is embodied and/or can be disposed on the vehicle in such a way that, on the one hand, it can be removed without damaging the vehicle, but, on the other hand, it can only be removed from the vehicle by destroying the advertising medium itself.

21. A process for payment of the fee for the attachment of at least one advertising medium to a vehicle, comprising the steps of a. checking by means of a first communication device disposed at a control point and a second communication device disposed on the advertising medium for the presence of the advertising medium on the vehicle and causing the generation of a signal indicative thereof, and b. issuing a credit as payment for the attachment of the advertising medium to the vehicle in response to the signal.

22. The process according to claim 21, wherein the checking step includes detecting the integrity of the advertising medium and the credit issuing step is carried out only if the integrity of the advertising medium has been detected.

23. The process according to claim 21, wherein the credit is only issued if a predetermined time period has passed since a credit was last issued.

24. The process according to claim 21, wherein the credit is issued by means of immediate calculation into an amount to be paid at the control point.

25. The process according to claim 21, wherein the credit is issued in the form of a credit receipt.

26. The process according to claim 21, wherein the credit is issued by means of a corresponding entry on a read/write storage medium.

27. A process for checking and paying for the presence of an advertisement on vehicles at set time intervals wherein fuel credits are redeemed by the drivers of the vehicles at filling stations after the presence of the advertisement is checked.

28. The process according to claim 27, wherein the redemption of this credit is dependent upon whether a predetermined time has passed since a most recent prior partial entry of a credit was redeemed.

29. The process according to claim 27, wherein the checking is carried out automatically by the exchange of machine-readable information between the vehicle and the filling station.

30. The process according to claim 27, wherein data regarding the fuel credit is stored in a debitable chip card.

31. The process according to claim 27, wherein a debitable medium that contains the fuel credit is attached proximate to a fuel fill conduit of the vehicle and a gas pump nozzle with a device for debiting the cost of dispensed fuel from the medium and from an account is provided in the filling station.

32. A process for checking and paying for the presence of an advertisement on vehicles at set time intervals, wherein:

fuel credits are redeemed by the drivers of the vehicles at filling stations after the presence of the advertisement is checked;

a debitable medium that contains the fuel credit is attached proximate to a fuel fill conduit of the vehicle and a gas pump nozzle with a device for debiting the cost of dispensed fuel from the medium and from an account is provided in the filling station; and the debitable medium only permits the debit if a positive message is supplied to the device attached to the vehicle, which device communicates with the medium and determines the integrity of the advertising surfaces.

* * * * *

UNITED STATES PATENT AND TRADEMARK OFFICE
CERTIFICATE OF CORRECTION

PATENT NO. : 6,356,877 B1
DATED : March 16, 2002
INVENTOR(S) : Schulden et al.

It is certified that error appears in the above-identified patent and that said Letters Patent is hereby corrected as shown below:

<u>Title page,</u>
Item [54], Title, "APPARATUS AND PROCESS FOR AUTOMATED PAYMENT FOR THE ATTACHMENT OF ADVERTISING TO A VEHICLE" should read -- APPARATUS AND PROCESS FOR AUTOMATED PAYMENT OF THE FEE FOR THE ATTACHMENT OF AN ADVERTISING MEDIUM TO A VEHICLE --

Item [56], References Cited, OTHER PUBLICATIONS, insert -- Burt, Erin, "Deals on Wheels", Kiplinger's Personal Finance, December 2000, copied from http://www.kiplinger.com/magazine/archives/2000/December/ahead/wheels.html Item [57], ABSTRACT,
Line 1, "The apparatus" should read -- Apparatus and process for automated payment of the fee for the attachment of an advertising medium to a vehicle --; and "20" should be deleted
Line 2, "14" should be deleted;
Line 3, "26" should be deleted; and "16" should be deleted Insert -- [30] Foreign Application Priority Data
    198 30 090 Aug. 22, 1998 Germany --

<u>Column 7,</u>
Line 45, "Otto" should read -- auto --

UNITED STATES PATENT AND TRADEMARK OFFICE
CERTIFICATE OF CORRECTION

PATENT NO.     : 6,356,877 B1
DATED          : March 16, 2002
INVENTOR(S)    : Schulden et al.

It is certified that error appears in the above-identified patent and that said Letters Patent is hereby corrected as shown below:

<u>Column 9,</u>
Line 52, "the second" should read -- wherein the second --

Signed and Sealed this

First Day of April, 2003

JAMES E. ROGAN
*Director of the United States Patent and Trademark Office*